United States Patent
Podewski et al.

(10) Patent No.: US 6,817,616 B2
(45) Date of Patent: Nov. 16, 2004

(54) AUTOMOTIVE BODY

(75) Inventors: Lutz Podewski, Muehlacker (DE); Ulf Habermalz, Braunschweig (DE); Werner Sewerin, Guetersloh (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 135 days.

(21) Appl. No.: 10/257,052

(22) PCT Filed: Jan. 29, 2002

(86) PCT No.: PCT/EP02/00874
§ 371 (c)(1),
(2), (4) Date: Oct. 8, 2002

(87) PCT Pub. No.: WO02/062648
PCT Pub. Date: Aug. 15, 2002

(65) Prior Publication Data
US 2003/0075877 A1 Apr. 24, 2003

(30) Foreign Application Priority Data
Feb. 6, 2001 (DE) .......... 101 05 280

(51) Int. Cl.⁷ ............................. F16I 15/02
(52) U.S. Cl. .............. 277/316; 277/630; 277/650
(58) Field of Search ............... 277/630, 650, 277/316; 296/187.01, 187.02, 205

(56) References Cited

U.S. PATENT DOCUMENTS

| 5,102,188 | A | * | 4/1992 | Yamane | 296/205 |
| 5,642,914 | A | * | 7/1997 | Takabatake | 296/187.02 |
| 5,678,826 | A | | 10/1997 | Miller | |
| 5,725,272 | A | * | 3/1998 | Jones | 296/208 |
| 5,931,474 | A | * | 8/1999 | Chang et al. | 277/316 |
| 6,135,542 | A | * | 10/2000 | Emmelmann et al. | 296/205 |
| 6,347,799 | B1 | * | 2/2002 | Williams et al. | 277/316 |
| 6,382,635 | B1 | * | 5/2002 | Fitzgerald | 277/630 |
| 6,413,611 | B1 | * | 7/2002 | Roberts et al. | 428/99 |

FOREIGN PATENT DOCUMENTS

| JP | 08-188176 | 7/1996 |
| WO | 98/36944 | 8/1998 |

* cited by examiner

Primary Examiner—Alison K. Pickard
(74) Attorney, Agent, or Firm—Crowell & Moring LLP

(57) ABSTRACT

A body of a motor vehicle includes a body element having a cavity and an opening to the cavity introducing a cavity protective fluid into the cavity. The body further includes a sealing element disposed in the cavity. The sealing element divides the cavity into two subcavities and a passage providing fluid communication between the two subcavities for the flow of cavity protective fluid. The passage includes a siphon.

2 Claims, 1 Drawing Sheet

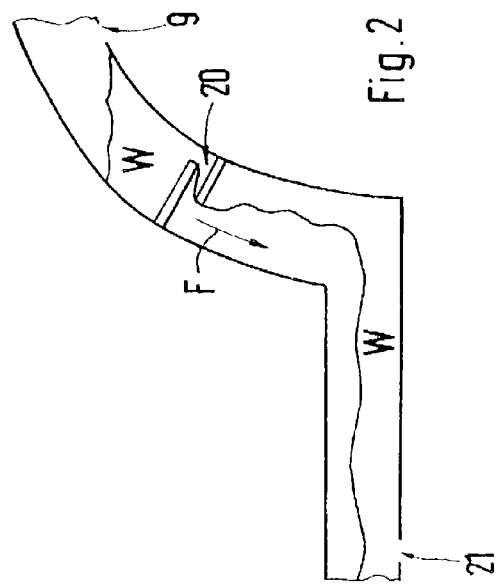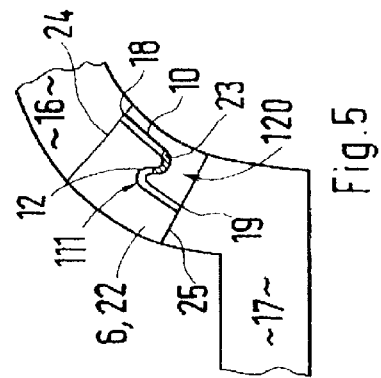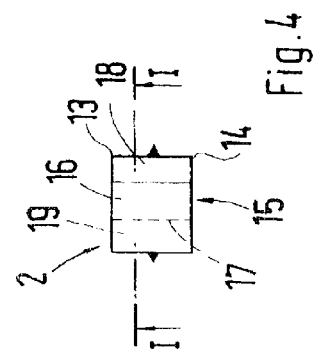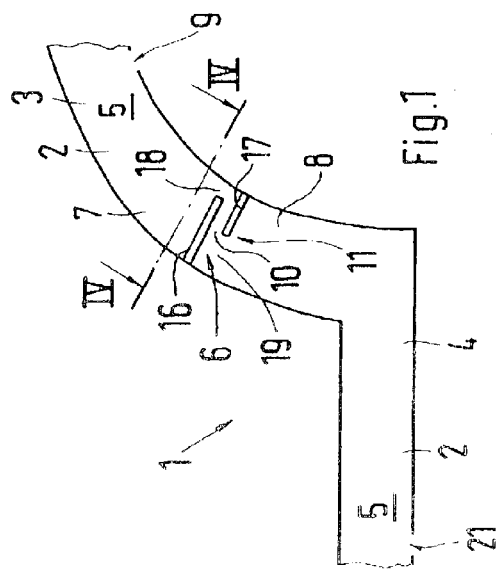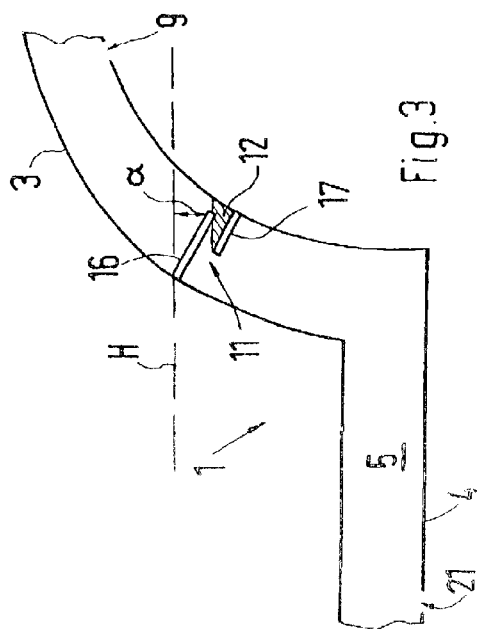

AUTOMOTIVE BODY

BACKGROUND AND SUMMARY OF THE INVENTION

The invention relates to a body of a motor vehicle.

In the automotive industry it is known to seal the cavities of the body elements, in particular pillar and frame member cross sections. Thus, the transition region of two body elements, for example a connecting node between a door sill and a pillar, is sealed. Between the sill and the pillar is a sealing element, which separates the cavity into two subcavities. Two other subcavities can be formed, for example, by the sill and the adjoining wheel house. The sealing element, located between the subcavities, serves in particular to seal the wet and dry area in order to prevent moisture, which is present in the frame members or the pillars, from passing into the interior of the vehicle. In addition, these sealing elements reduce the transfer of airborne sound inside the frame member and pillar structure.

To introduce a protective liquid against corrosion, especially liquid wax, into the cavity, DE 691 02 009 T2 discloses that an opening is provided in the direction of the cavity. Through the opening the liquid wax can be introduced when it is still warm. After cooling or solidifying, this liquid wax forms a protective layer against corrosion on the inside walls of the cavities. Then this opening to the cavity is sealed with a stopper.

An object of the invention is to provide a body of a motor vehicle, with which cavity protection is achieved in the subcavities, which are separated from each other by a sealing element.

This problem is solved with the preferred embodiments of the present invention as described hereinafter.

The advantages of the invention includes that in operating the vehicle the airborne sound cannot propagate from one subcavity to another subcavity, because the solidified protective fluid for the cavity forms a barrier in the airborne sound segment. It is especially advantageous that for the protection of the cavity, the liquid protective fluid for the cavity can be introduced through a siphon into each of the subcavities. In addition, a liquid seal in the direction of the subcavities is achieved.

The siphon can be provided especially easily and economically according to certain preferred embodiments of the invention. As an alternative, an insert could also be introduced as the sealing element into the body element. The insert has a continuous channel, which is curved at least in some segments and thus forms a siphon curve.

Other objects, advantages and novel features of the present invention will become apparent from the following detailed description of the invention when considered in conjunction with the accompanying drawings.

BRIEF DESCRIPTION OF THE DRAWING

FIG. 1 is a sectional view of a portion of a car body in the transition region between the wheel house and the door sill.

FIG. 2 depicts the filling of the cavities with liquid wax.

FIG. 3 depicts the siphon, which lies between two subcavities and which is sealed by solidified wax, according to a first embodiment.

FIG. 4 is a sectional view along the line IV—IV in FIG. 1; and

FIG. 5 depicts a siphon, inserted into a body element, according to a second embodiment.

DETAILED DESCRIPTION OF THE DRAWINGS

A portion of a car body 1, shown in FIG. 1, comprises a wheel house 3 and a side or door sill 4, although the present invention can be used with any suitable elements of the car body. Other body elements, which are not specifically shown, can be, for example, the roof frame; the pillars, extending between the roof frame and the door sill; the transverse frame members, extending between the door sills; or other pillars and frame members as well as a front windshield cowl.

The body 1 or at least one of the body elements 2 has a cavity 5, which is divided into two subcavities 7 and 8 by a sealing element 6, which is also referred to as a compartmentalization. The sealing element 6 can also lie between two cavities 5 of two adjoining body elements 2 and thus seal the cross section of at least one of the body elements 2. At least one of the cavities 5 has an inlet opening 9, through which a protective fluid W for the cavity, for example a preservative, in particular liquid wax, can be introduced into the cavity 5. The liquid wax W is liquid when at least introduced into the cavities 5, 7, and 8 so that under gravity it flows downward into the cavities 5 or subcavities 7 and 8, as is shown in FIG. 2. In order for the liquid wax W to pass from the subcavity 7 into the subcavity 8 and into the cavity 5 of the door sill 4, the sealing element 6 has a passage 10, which functions as a siphon 11. Through the siphon 11, according to FIG. 2, the liquid wax W can flow. However, the siphon 11 is not totally emptied, and residual liquid wax W remains in the siphon 11. When the liquid wax W solidifies, for example, by means of cooling, it forms in the siphon 9 a wax sealing stopper 12 (FIG. 3), which constitutes a barrier for sound energy fluxes inside the hollow body elements 2. Thus, with the siphon 11 the areas of the body 1 that are sealed by the sealing elements can be preserved with wax and still fulfill the acoustical requirements of tight compartmentalization.

As shown from FIG. 4, a body element 2 is formed preferably by two blanks 13 and 14, which are preferably sheet metal blanks and are mechanically worked into the shape of a shell. The two blanks 13 and 14 are joined, for example by welding, at their peripheral regions and thus are fitted together to form a sheet bar 15, which forms the body element 2. The cross section of the sheet bar 15 and the cross section of the cavity 5 are rectangular, although it can be arbitrarily circular or square. In the illustrated embodiment the siphon 11 is includes two separating elements 16 and 17 inside the sheet bar 15. The separating elements 16 and 17 are separated from each in the flow direction F of the liquid wax W, and have passage openings 18 or 19 respectively. Each separating element 16 and 17 can extend over the entire cross section of the cavity 5 has the passage opening. The two passages 18 and 19 are then offset, as seen at right angles to the flow direction F of the liquid wax W. Thus, the siphon 11 can be realized in a simple way, when the separating elements are arranged in such a manner that there is a siphon curve 20, in which a residual quantity of wax remains. Preferably the separating elements 16 and 17 are oriented in such a manner that they form with the horizontal line H an angle α.

In a preferred embodiment, the two separating elements 16 and 17 extend only partially over the cross section of the cavity 5, as shown in FIGS. 1 to 4. Thus, the first passage opening 18 lies between the free end of the first separating element 16 and the inside wall of the sheet bar 15. The second passage opening 19 lies between the free end of the second separating element 17 and the inside wall of the sheet bar 15 so that even in this design of the sealing element 6 the passage openings are offset in relation to each other.

Prior to the assembly of the two blanks 13 and 14, one of the separating elements 16 or 17 is inserted preferably into each blank and connected, preferably rigidly, to the blank 13 or 14. During the assembly of the blanks 13 and 14 to form a sheet bar 15, the siphon 11 is formed. Of course, it is also possible to insert both the first and the second separating elements 16 and 17 into one of the blanks 13 or 14 and to connect them rigidly to the same and then to join the blanks together.

Thus, with the sealing element 6 including the siphon 11, the liquid wax can reach areas of the body 1 that cannot be otherwise preserved. As the wax flows through the inlet opening 9, the liquid wax W enters, as seen in the flow direction F, into the lower cavities. After the wax has solidified, it seals the siphon 11 with the residual wax remaining as the sealing stopper 12. In at least one of the body elements 2 there is an outlet opening 21, from which excess wax W can be drained. Both the inlet 9 and the outlet 21 opening can be sealed with a sealing element (not illustrated).

FIG. 5 shows a second embodiment of a siphon 111 in the cavity 5. This siphon 111 is designed as an insert 22 forming the sealing element 6. The insert has a continuous tube 23, which connects the subcavities 16 and 17 and which is designed as a curve in segments and forms a siphon curve 120, in which the sealing stopper 12 is disposed. The tube 23 lies between two ends 24 and 25 of the insert 22 and has a passage opening 18 or 19 on each end 24 or 25. These ends can be formed by the separating elements 16, 17.

What is claimed is:

1. A method of sealing a body element of a motor vehicle, the method comprising:

introducing a cavity protective fluid into a cavity of the body element;

allowing the cavity protective fluid to flow from one subcavity of the cavity into another subcavity of the cavity through a passage in a sealing element separating the two subcavities; and allowing the cavity protective fluid to solidify, wherein the cavity protective fluid retained in a siphon of the passage solidifies to seal the passage.

2. The method, as claimed in claim 1, further comprising using the separating element to seal the cross section of at least one of a pillar and a frame member of the motor vehicle.

* * * * *